(12) United States Patent
Schultz

(10) Patent No.: US 6,379,100 B2
(45) Date of Patent: Apr. 30, 2002

(54) APPARATUS FOR LOADING A TRUCK BOX

(76) Inventor: Richard Schultz, Box 1244, Beausejour, Manitoba (CA), R0E 0C0

( * ) Notice: Subject to any disclaimer, the term of this patent is extended or adjusted under 35 U.S.C. 154(b) by 0 days.

(21) Appl. No.: 09/759,277

(22) Filed: Jan. 16, 2001

(51) Int. Cl.[7] ................................................. B60P 1/24
(52) U.S. Cl. .................. 414/499; 414/522; 414/539; 414/679; 414/478; 414/491; 296/35.3
(58) Field of Search ................................ 296/35.3, 183, 296/51, 57.1, 58, 59, 60, 61, 62; 414/522, 498, 499, 500, 939, 679, 467, 506, 477, 478, 429, 491; 298/1 A

(56) References Cited

U.S. PATENT DOCUMENTS

| | | | |
|---|---|---|---|
| 3,155,258 A | * 11/1964 | Fincannon | 414/498 |
| 3,409,154 A | * 11/1968 | Rassmussenetal | 414/499 |
| 3,521,776 A | * 7/1970 | Talbot | 414/499 |
| 3,601,271 A | * 8/1971 | Margetts et al. | 414/499 |
| 3,630,571 A | * 12/1971 | Saldana | 298/14 |
| 3,921,843 A | * 11/1975 | Rasmussenetal | 414/499 |
| 4,470,746 A | * 9/1984 | Delachapelle | 414/478 X |
| 4,813,913 A | 3/1989 | Eischen | |
| 5,046,913 A | 9/1991 | Domek et al. | |
| 5,603,600 A | 2/1997 | Egan et al. | |
| 5,636,902 A | 6/1997 | Norbury | |
| 5,829,945 A | 11/1998 | Stanley | |
| 6,019,567 A | 1/2000 | Lutkus et al. | |

FOREIGN PATENT DOCUMENTS

| | | | |
|---|---|---|---|
| CA | 928457 | 6/1973 | |
| CA | 2076255 | 2/1994 | |
| CA | 2079170 | 3/1994 | |
| CA | 2134482 | 4/1996 | |
| CA | 2230610 | 9/1998 | |
| WO | WO 8607019 | * 12/1986 | 414/494 |

* cited by examiner

Primary Examiner—Frank E. Werner
(74) Attorney, Agent, or Firm—Adrian D. Battison; Ryan W. Dupius; Michael R. Williams

(57) ABSTRACT

An apparatus for loading a truck box is provided for use with snowmobiles and the like. The apparatus includes a pair of mounting elements arranged to mount on the respective tailgate mounts of the truck box in place of the tailgate of the truck so that no modification to the truck bed is required upon installation. A shaft is supported on the pair of mounting elements for rotation about an axis laterally across the back end of the truck box and includes a sprocket coupled for rotation therewith. A frame arranged to support a snowmobile and the like thereon is supported on the shaft to extend transversely thereto and has a rack mounted on a bottom side thereof for engaging the sprocket. Rotation of the shaft displaces the frame between a loading position wherein the frame extends rearwards from the forward end supported on the shaft to the rearward end supported on the ground and a loaded position wherein the frame extends forwards from the rearward end supported on the shaft to the forward end supported on the truck box.

18 Claims, 5 Drawing Sheets

APPARATUS FOR LOADING A TRUCK BOX

FIELD OF THE INVENTION

This invention relates to an apparatus being arranged to mount on a truck box for loading an object into the truck box and more particularly to an apparatus being arranged to support a small recreational vehicle thereon for loading the vehicle into the truck box.

BACKGROUND

When using small recreational vehicles including snowmobiles and the like it is often desirable to transport the vehicles from one location to another. This is typically accomplished using a small trailer or in some cases a lift which is adapted to mount in the box of a conventional pick up truck. The majority of snowmobiles do not have a reverse gear and thus the use of a simple ramp mounted on a truck bed is generally not sufficient to assist someone in unloading the snowmobile from a truck bed. While trailers are useful for supporting these vehicles thereon, a trailer is large and difficult to store when not in use and is often relatively expensive.

Known lifts for mounting in a box of a truck however, are also of significant size often involving a large deck for supporting the vehicle thereon and a complex powered linkage arranged to lift the deck into the box of the truck. While these lifts are generally more compact than a trailer, the complex powered linkage which is required to raise the deck into the box is relatively costly and includes numerous moving parts which may require maintenance. Furthermore, known lifts generally require some form of modification to the truck box for mounting the lift to the truck at a plurality of mounting points. The task of installing or removing the lift from the truck is thus difficult and time consuming.

SUMMARY

According to one aspect of the present invention there is provided an apparatus for loading an object onto a truck having a truck box and a pair of tailgate mounts which are laterally spaced apart across a rear end of the truck box for mounting a tailgate thereon, the apparatus comprising:

a pair of mounting elements arranged to mount on the respective tailgate mounts of the truck box;

a shaft supported on the pair of mounting elements for rotation about an axis extending between the mounting elements;

a sprocket coupled to the shaft for rotation therewith;

a frame supported on the shaft to extend transversely thereto and being arranged to support the object thereon;

a rack mounted on a bottom side of the frame for engaging the sprocket such that the frame is displaced transversely to the shaft in a longitudinal direction when the sprocket is rotated; and drive means for driving rotation of the shaft;

the frame being movable with rotation of the shaft between a loading position in which the frame extends rearwards from the forward end supported on the shaft to the rearward end supported on the ground and a loaded position in which the frame extends forwards from the rearward end supported on the shaft to the forward end supported on the truck box.

The mounting elements of the present invention allows the apparatus to be easily mounted on a truck box without any modification to the truck box, other than the removal of the tailgate. The apparatus is simple in construction with few inexpensive parts such that maintenance as well as mounting and removal of the apparatus from a truck box are accomplished with little effort. A vehicle supported on the apparatus is movable with the frame between the loaded and loading positions such that the vehicle is on an incline for unloading. This is particularly useful to assist in unloading a snowmobile which does not have a reverse gear.

There may be provided a cross member mounted at respective ends on the mounting elements, the cross member being arranged to support the shaft thereon.

The cross member is preferably adjustable in length such that the mounting elements are arranged to mount on various sizes of trucks.

There may provided a bumper support coupled to the cross member and being arranged to support the cross member on a bumper of the truck.

The bumper support is preferably adjustable in height for supporting the cross member at any one of numerous selected spacings above the bumper in use.

The frame preferably comprises a pair of spaced apart rails, each rail having a pair of upwardly extending side flanges for guiding a recreational vehicle thereon.

There may be provided a plurality of telescoping crossbars coupled between the rails for coupling the rails together at any one of numerous selected spacings therebetween.

Preferably there is provided a pair of sprockets mounted on the shaft and a pair of racks being mounted on the respective rails, the racks being arranged to engage the sprockets respectively.

The sprockets may be adjustably mounted on the shaft for mounting the sprockets at a selected spacing therebetween corresponding to a selected spacing of the rails.

The sprockets are preferably mounted on respective collars, the collars being mounted for longitudinal sliding movement on the shaft.

The collars and a corresponding portion of the shaft slidably mounting the collars thereon each preferably have a rectangular cross section such that the collars are arranged to be rotated with the shaft.

Preferably there is provided box engaging means at a forward end of the frame being arranged to support the forward end of the frame for longitudinal sliding movement along the truck box. The box engaging means may take the form of a pair of wheels or a pair of runners which function similarly.

Preferably there is provided ground engaging means at a rearward end of the frame being arranged to support the rearward end of the frame for longitudinal sliding movement along the ground. The ground engaging means may comprise a pair of skis or any type of wheel arrangement.

Preferably there is provided a ratchet mechanism coupled to the shaft such that rotation of the shaft in one direction is restricted when the ratchet mechanism is engaged. The use of a 2-way ratchet mechanism of the type commonly used on boat winches is generally preferred.

In one embodiment, the drive means may comprise a manual crank mounted on one end of the shaft for manually rotating the shaft. The shaft may also be driven by an electric motor or a drive box coupled to the engine of the truck for driving the frame between the respective loading and loaded positions. The electric motor would preferably include an integral brake mechanism.

According to a further aspect of the present invention there is provided an apparatus in combination with a truck having a truck box and a pair of tailgate mounts which are laterally spaced apart across a rear end of the truck box for mounting a tailgate thereon, the apparatus comprising:

a pair of mounting elements arranged to mount on the respective tailgate mounts of the truck box;

a shaft supported on the pair of mounting elements for rotation about an axis extending between the mounting elements;

a sprocket coupled to the shaft for rotation therewith;

a frame supported on the shaft to extend transversely thereto and being arranged to support the object thereon;

a rack mounted on a bottom side of the frame for engaging the sprocket such that the frame is displaced transversely to the shaft in a longitudinal direction when the sprocket is rotated; and drive means for driving rotation of the shaft;

the frame being movable with rotation of the shaft between a loading position in which the frame extends rearwards from the forward end supported on the shaft to the rearward end supported on the ground and a loaded position in which the frame extends forwards from the rearward end supported on the shaft to the forward end supported on the truck box.

BRIEF DESCRIPTION OF THE DRAWINGS

In the accompanying drawings, which illustrate exemplary embodiments of the present invention.

DETAILED DESCRIPTION

Figure 1:
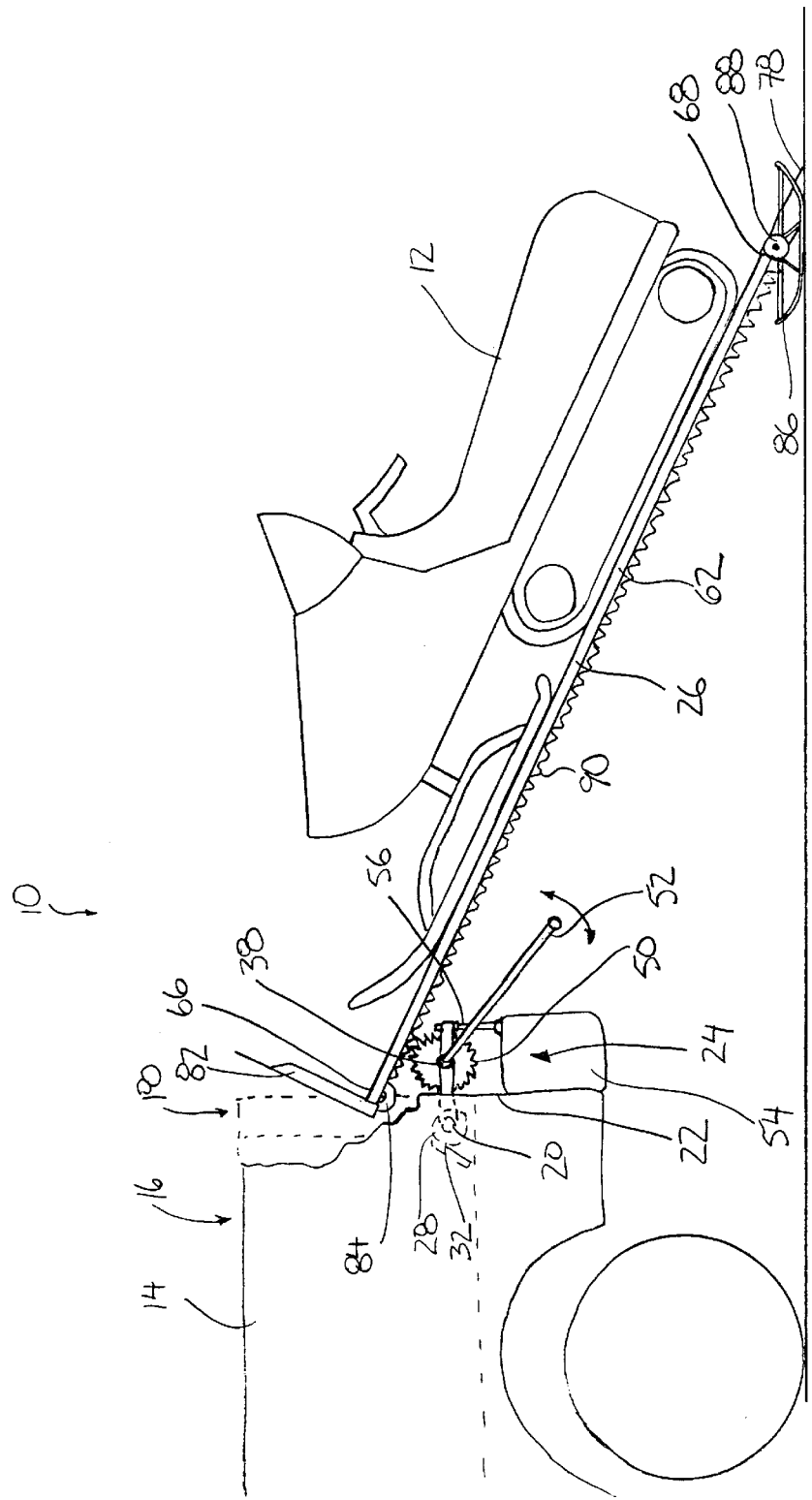
FIG. 1 is a side elevational view of the apparatus mounted on a truck box with a snowmobile shown supported thereon in a loading position.
Figure 2:
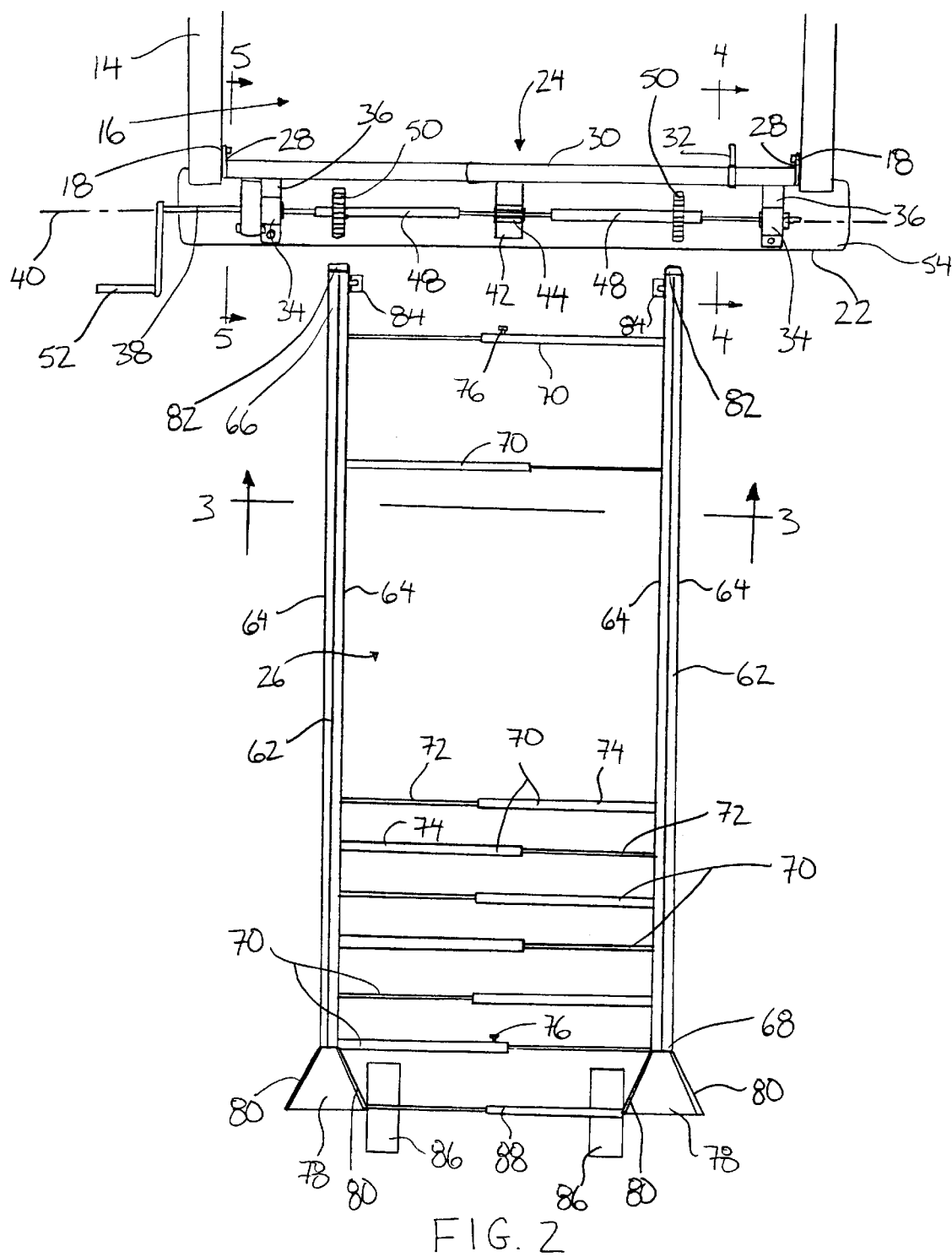
FIG. 2 is a top plan view of the apparatus with the frame shown separated from the drive unit.
Figure 3:
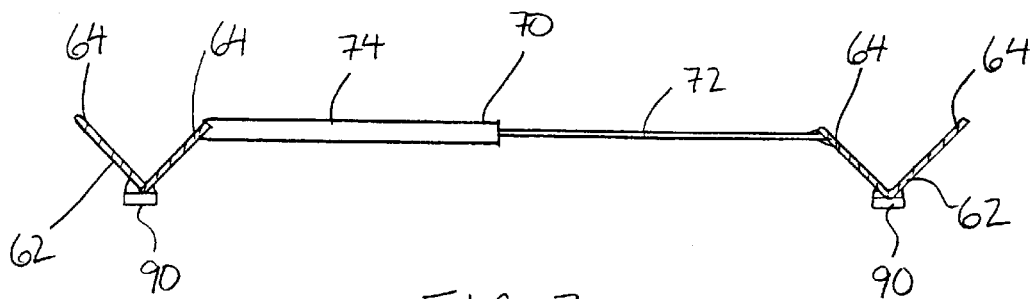
FIG. 3 is a cross sectional view along the line 3—3 of FIG. 2.
Figure 4:
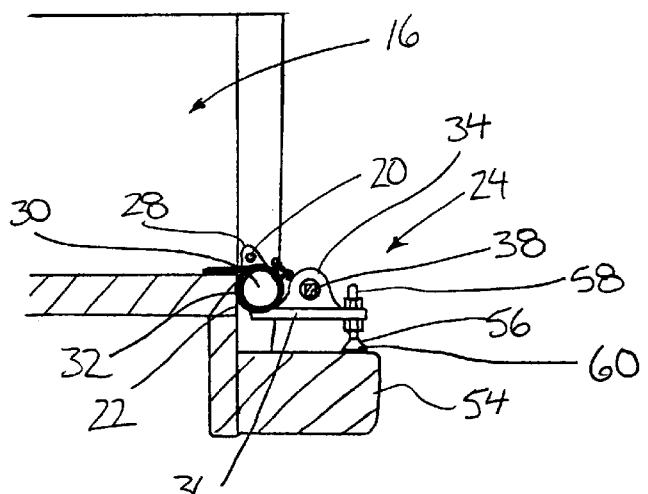
FIG. 4 is a cross sectional view along the line 4—4 of FIG. 2.
Figure 5:
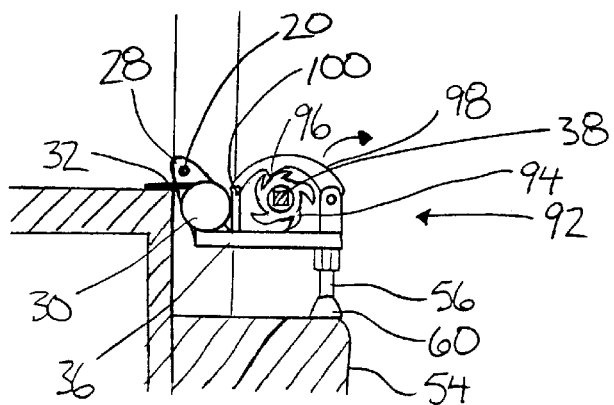
FIG. 5 is a cross sectional view along the line 5—5 of FIG. 2.

Referring to the accompanying drawings, there is illustrated an apparatus generally indicated by reference numeral 10. The apparatus 10 is intended for use in loading a snowmobile 12 or similar recreational vehicle into a conventional pickup truck 14.

The truck 14 generally includes a truck box 16 having a tailgate 18 which is pivotally mounted between a pair of tailgate mounts 20 which are laterally spaced apart across a rear end 22 of the truck.

The apparatus includes a base 24 which is mounted on the truck and a frame 26 which is supported on the base. The frame 26 is arranged to support the snowmobile 12 thereon while being movable between a loading position shown in FIG. 1 and a loaded position shown in FIG. 6C.

The base 24 includes a pair of mounting elements 28 which are arranged to mount on the respective tailgate mounts 20 once the tailgate 18 has been removed from the truck. A crossbar 30 is mounted at respective ends on the mounting elements 28 to extend therebetween. Each mounting element comprises an elliptical plate arranged to receive a bolt therethrough for securing the plate to the respective tailgate mount while securing the corresponding end of the crossbar 30 thereon. A locking collar 32 in the form a C-clamp having a lug mounting thereon is secured to the crossbar 30 such that engagement of the lug on the truck box floor resists pivotal deflection of the cross bar 30 about a tailgate axis extending between the respective tailgate mounts.

A pair of bearings 34 are mounted on a respective pair of base plates 36 which are supported on the crossbar 30 at spaced apart locations thereon. Each base plate 36 is welded adjacent a respective end of the crossbar 30 to extend substantially rearward therefrom when mounted on the truck box. A shaft 38 is supported on the bearings 34 to extend therebetween for rotation about a lateral axis 40 which is parallel to the tailgate axis. A center support 42 extends rearward from the crossbar spaced between the pair of bearings 34 for supporting a half bushing 44 thereon. The half bushing 44 is arranged to support a central portion of the shaft 38 thereon.

The shaft 38 includes a slide portion of rectangular cross section extending between the pair of bearings 34. A pair of collars 48 of rectangular cross section are mounted on the square portion of the shaft 38 for longitudinal sliding movement thereon. Each collar 48 mounts a drive sprocket 50 thereon such that the sprocket is arranged to rotate about the lateral access 40 while being slidably moveable in a longitudinal direction along the shaft 38 with the rectangular collars 48. A manual crank 52 is mounted on one end of the shaft 38 for driving the rotation thereof.

The base plates 36 are arranged to be supported to extend horizontally above a bumper 54 of the truck by a respective pair of adjustable legs 56. Each leg 56 includes a threaded portion 58 which is arranged to extend through the respective base plate and a foot 60 on a bottom end thereof for engaging the bumper. A pair of nuts secure the threaded portion 58 to the respective base plates.

The frame 26 includes a pair of rails 62 which extend longitudinally with the frame being parallel and spaced apart. Each rail is a V-shaped member with upwardly extending flanges 64 extending longitudinally from a front end 66 of the frame to a back end 68 of the frame.

A plurality of telescoping connecting bars 70 extend laterally between the pair of rails 62 such that the connecting bars are substantially parallel and longitudinally spaced apart. Each bar 70 includes a rod end 72 which is slidably received within a tube end 74 such that a width of the overall frame 26 is adjustable. A forward most and rearward most connecting bar 70 each include a screw lock 76 thereon for restricting sliding movement of the corresponding rod end within the corresponding tube end of the bars for securing the rails at a fixed spacing therebetween. The bars 70 are positioned in an alternating arrangement between the respective rod ends and tube ends spaced longitudinally along the frame. A spacing of the connecting bars is concentrated towards the rear end of the frame for supporting a track of the snowmobile thereon.

Each rail 62 includes a guide member 78 mounted on the back end thereof. The guide member comprises a pair of outwardly extending flanges 80 and a base plate extending therebetween which is arranged to guide a corresponding one of the skis of a snowmobile into the V-shaped rail 62. A stop 82 is mounted on the front end 66 of each rail and extends upwardly therefrom for engaging a front end of the skis of the snowmobile once the snowmobile has been fully loaded onto the frame.

A pair of castor wheels 84 are mounted on the respective inner sides of the corresponding rails adjacent the front end thereof for supporting the front end for sliding movement along the truck box. A pair of skis 86 are mounted about a rear axle 88 which extends between the respective guide members 78 at the back end of the frame. The axle 88 is arranged to be telescopic similarly to the connecting bars 70. The skis thus support the back end of the frame for sliding movement along the ground as the frame is displaced between the loading and loaded positions.

A rack 90 in the form of a chain is welded along a bottom side of each rail 62. The pair of racks 90 are arranged to mesh with the respective pair of sprockets for displacing the frame longitudinally in and out of the truck box as the shaft 38 is rotated. The spacing between the sprockets and the corresponding rails are both adjustable such that the sprockets remain engaged with the corresponding racks regardless of the rail spacing.

A ratchet mechanism 92 is provided for restricting rearward movement of the frame as the frame is displaced upwardly from the loading to the loaded position. The ratchet mechanism operates similarly to conventional ratchet mechanisms wherein a sprocket 94 is provided with a plurality of teeth thereon wherein each tooth has a forward camming face and a rearward locking face. A lug 96 is arranged to engage the teeth of the sprocket 94 such that the lug is deflected upward when the sprocket is rotated in the forward direction while the lug 96 is arranged to engage the rear locking face in a locked position if the sprocket is rotated rearwardly. A locking arm 98 is mounted above the sprocket 94 and pivotally mounted at a rearward end on one of the base plates 36. The lug 96 is mounted on the locking arm 98 such that pivotal deflection of the locking arm away from the sprocket 94 disengages the lug from the sprocket for freely rotating the shaft in either forward or rearward directions. A pin lock 100 at a forward end of the locking arm 98 secures the lug 96 in an engaged position with the sprocket 94 for selectively restricting rotation of the shaft in either forward or rearward directions.

In use, the frame is first positioned in the loading of FIG. 1 wherein the front end of the frame is supported on the shaft and the rear end of the frame is spaced rearwardly therefrom and supported on the ground. The ratchet mechanism 92 is secured using the pin lock to lock the frame in position as the shaft 38 is restricted from rotation. The snowmobile may then be driven up onto the frame by lining up the skis of the snowmobile with the rails. The snowmobile is continued to be driven up onto the frame until the track is completely supported on the connecting bars 70.

Figure 6A:
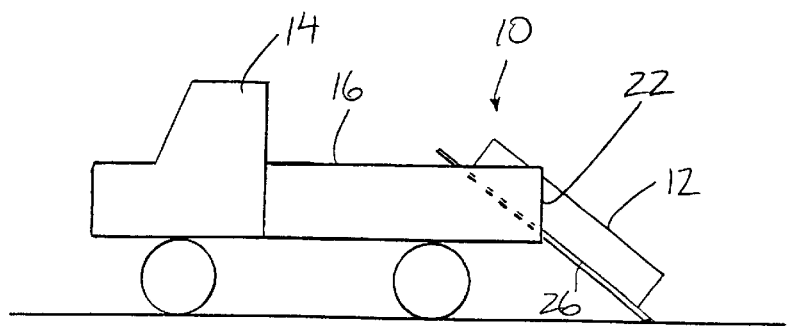
FIGS. 6A, 6B and 6C are side elevational schematics of the apparatus shown in a partially raised position, a levelled position and a loaded position respectively.
Figure 6B:
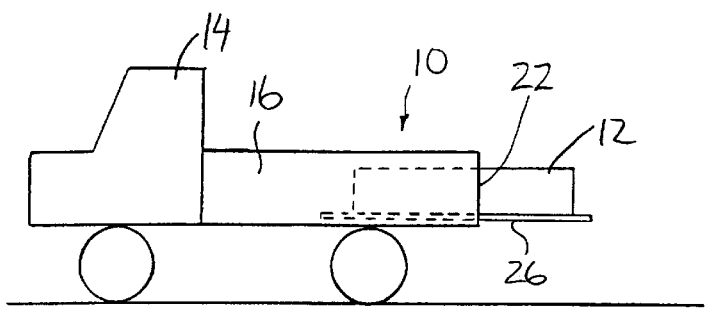

Loading is commenced by unlocking the pin lock 100 and rotating the shaft 38 using the crank 52. The shaft is rotated until the frame is located in the partially raised position of FIG. 6A wherein the frame is evenly balanced on the shaft. Tipping the frame forwardly to the levelled position of FIG. 6B allows the frame to be subsequently displaced into the loaded position of FIG. 6C by continued cranking of the rotation of the shaft 38. In the loaded position, the front end of the frame is supported on the truck bed by the castor wheels 84 while the rear end of the frame is supported on the shaft.

Figure 6C:
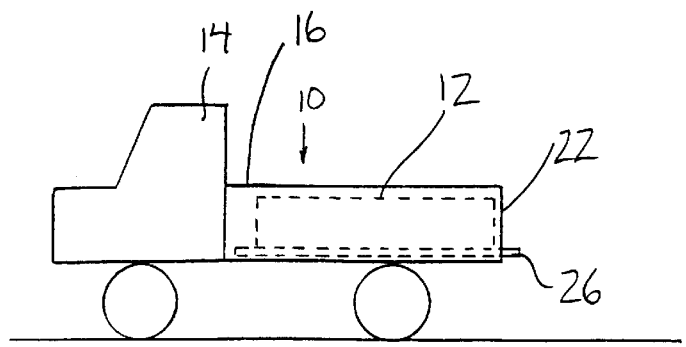

To unload the snowmobile 12 from the loaded position of FIG. 6C the locking pin 100 is removed from the ratchet mechanism allowing the locking arm 98 to be pivoted upward and away from sprocket 94. The shaft 38 is thus free to be rotated in a reverse direction for displacing the frame in a longitudinal rearward direction. Once the snowmobile reaches the levelled position of FIG. 6B, the snowmobile is tipped about the shaft 38 to the position of FIG. 6A such that the ground engaging means in the form of the skis 86 engages the ground. Continued rotation of the shaft will slide the skis along the ground until the frame reaches the unloaded position of FIG. 1. The upward incline of the rails allows the snowmobile to be easily pushed down the frame passed the rearward end of the rails such that the snowmobile is free from the apparatus 10. Alternatively the snowmobile may be pushed down the frame until the track engages the ground. The frame may thus be pulled out from under the snowmobile either by advancing the truck or by rotating shaft 38 in the forward direction for returning the frame to the loaded position of FIG. 6C while the snowmobile remains engaged on the ground.

Figure 7:
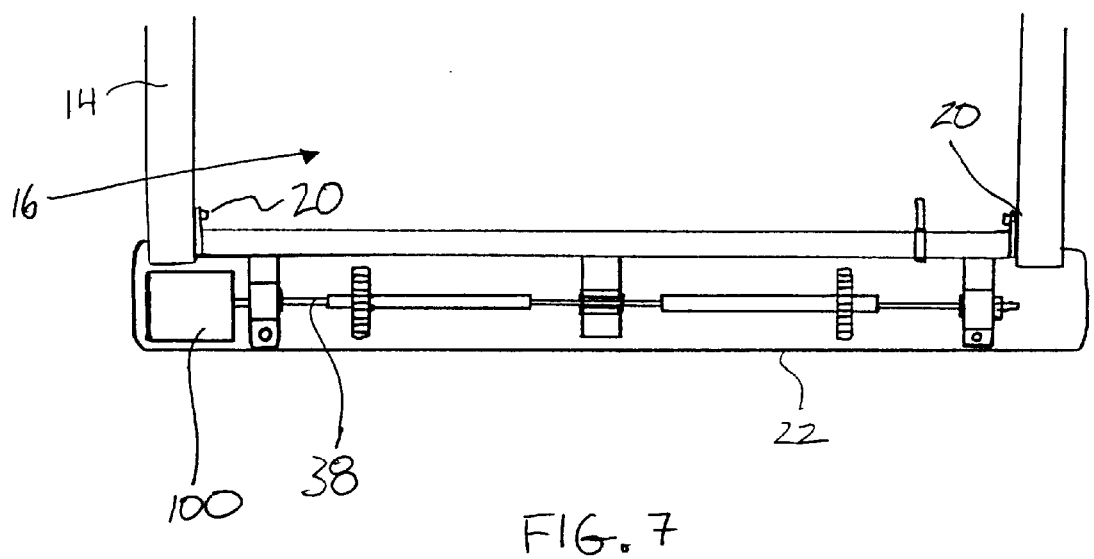
FIG. 7 is a partial top plan view of an alternate embodiment.

As illustrated in FIG. 7, in a further variation of the present invention, the shaft is driven by a motor 100. The motor preferably comprises an electric motor. In further embodiments however the motor 100 may also comprise an hydraulic motor or a chain drive system. The electric motor includes an integral brake mechanism to selectively stop the shaft at any point in its rotation for securing the ramp structure at any one of numerous positions between the loaded and loading positions.

In further embodiments, the rails 62 may be widened to form a ramp structure for supporting a corresponding pair of wheels of an all terrain vehicle thereon. By replacing the skis 86 with ground engaging wheels the apparatus would thus be adjusted for use with the all terrain vehicle. Similar modifications may also be used for adapting the apparatus 10 for use with such recreational type vehicles as a personal water craft.

Further modifications to the invention may include different types of ratchet mechanisms. The use of a 2-way ratchet mechanism of the type commonly used on boat winches is generally preferred.

While various embodiments of the present invention have been described in the foregoing, it is to be understood that other embodiments are possible within the scope of the invention. The invention is to be considered limited solely by the scope of the appended claims.

What is claimed is:

1. An apparatus for loading an object onto a truck having a truck box and a pair of tailgate mounts which are laterally spaced apart across a rear end of the truck box for mounting a tailgate thereon, the apparatus comprising:

a pair of mounting elements arranged to mount on the respective tailgate mounts of the truck box;

a shaft supported on the pair of mounting elements for rotation about an axis extending between the mounting elements;

a sprocket coupled to the shaft for rotation therewith;

a frame supported on the shaft to extend transversely thereto and being arranged to support the object thereon;

a rack mounted on a bottom side of the frame for engaging the sprocket such that the frame is displaced transversely to the shaft in a longitudinal direction when the sprocket is rotated; and drive means for driving rotation of the shaft;

the frame being movable with rotation of the shaft between a loading position in which the frame extends rearwards from a forward end supported on the shaft to a rearward end supported on the ground and a loaded position in which the frame extends forwards from the rearward end supported on the shaft to the forward end supported on the truck box.

2. The apparatus according to claim 1 wherein there is provided a cross member mounted at respective ends on the mounting elements, the cross member being arranged to support the shaft thereon.

3. The apparatus according to claim 2 wherein the cross member is adjustable in length such that the mounting elements are arranged to mount on various sizes of trucks.

4. The apparatus according to claim 2 wherein there is provided a bumper support coupled to the cross member and being arranged to support the cross member on a bumper of the truck.

5. The apparatus according to claim 4 wherein the bumper support is adjustable in height for supporting the cross member at any one of numerous selected spacings above the bumper in use.

6. The apparatus according to claim 1 wherein the drive means comprises a manual crank mounted on one end of the shaft for manually rotating the shaft.

7. The apparatus according to claim 1 wherein the frame comprises a pair of spaced apart rails, each rail having a pair of upwardly extending side flanges for guiding a recreational vehicle thereon.

8. The apparatus according to claim 7 wherein there is provided a plurality of telescoping crossbars coupled between the rails for coupling the rails together at any one of numerous selected spacings therebetween.

9. The apparatus according to claim 7 wherein there is provided a pair of sprockets mounted on the shaft and a pair of racks being mounted on the respective rails, the racks being arranged to engage the sprockets respectively.

10. The apparatus according to claim 9 wherein the sprockets are adjustably mounted on the shaft for mounting the sprockets at a selected spacing therebetween corresponding to a selected spacing of the rails.

11. The apparatus according to claim 10 wherein the sprockets are mounted on respective collars, the collars being mounted for longitudinal sliding movement on the shaft.

12. The apparatus according to claim 11 wherein the collars and a corresponding portion of the shaft slidably mounting the collars thereon each have a rectangular cross section such that the collars are arranged to be rotated with the shaft.

13. The apparatus according to claim 1 wherein there is provided box engaging means at a forward end of the frame being arranged to support the forward end of the frame for longitudinal sliding movement along the truck box.

14. The apparatus according to claim 1 wherein there is provided ground engaging means at a rearward end of the frame being arranged to support the rearward end of the frame for longitudinal sliding movement along the ground.

15. The apparatus according to claim 1 wherein there is provided a ratchet mechanism coupled to the shaft such that rotation of the shaft in one direction is restricted when the ratchet mechanism is engaged.

16. The apparatus according to claim 1 wherein the drive means comprises an electric motor for driving the frame between the respective loading and loaded positions.

17. The apparatus according to claim 16 wherein the electric motor includes an integral brake mechanism.

18. An apparatus in combination with a truck having a truck box and a pair of tailgate mounts which are laterally spaced apart across a rear end of the truck box for mounting a tailgate thereon, the apparatus comprising:

a pair of mounting elements arranged to mount on the respective tailgate mounts of the truck box;

a shaft supported on the pair of mounting elements for rotation about an axis extending between the mounting elements;

a sprocket coupled to the shaft for rotation therewith;

a frame supported on the shaft to extend transversely thereto and being arranged to support the object thereon;

a rack mounted on a bottom side of the frame for engaging the sprocket such that the frame is displaced transversely to the shaft in a longitudinal direction when the sprocket is rotated; and drive means for driving rotation of the shaft;

the frame being movable with rotation of the shaft between a loading position in which the frame extends rearwards from a forward end supported on the shaft to a rearward end supported on the ground and a loaded position in which the frame extends forwards from the rearward end supported on the shaft to the forward end supported on the truck box.

\* \* \* \* \*